(12) United States Patent
Li et al.

(10) Patent No.: US 11,252,095 B2
(45) Date of Patent: Feb. 15, 2022

(54) DATA TRANSMISSION METHOD AND COMMUNICATIONS DEVICE

(71) Applicant: HUAWEI TECHNOLOGIES CO., LTD., Shenzhen (CN)

(72) Inventors: Hong Li, Shanghai (CN); Feng Han, Shanghai (CN); Yinghao Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 16/670,066

(22) Filed: Oct. 31, 2019

(65) Prior Publication Data

US 2020/0067843 A1 Feb. 27, 2020
US 2021/0006498 A9 Jan. 7, 2021

Related U.S. Application Data

(63) Continuation of application No. PCT/CN2018/085514, filed on May 3, 2018.

(30) Foreign Application Priority Data

May 5, 2017 (CN) .......................... 201710313752.7

(51) Int. Cl.
*H04L 12/851* (2013.01)
*H04L 29/06* (2006.01)
(Continued)

(52) U.S. Cl.
CPC .......... *H04L 47/2483* (2013.01); *H04L 69/22* (2013.01); *H04W 28/0252* (2013.01);
(Continued)

(58) Field of Classification Search
CPC ............... H04L 47/2483; H04L 69/22; H04W 28/0252; H04W 28/0268; H04W 40/02; H04W 80/02; H04W 80/08
See application file for complete search history.

(56) References Cited

U.S. PATENT DOCUMENTS

2013/0021933 A1 1/2013 Kovvali et al.
2018/0014224 A1* 1/2018 Cheng ................. H04L 47/2425
(Continued)

FOREIGN PATENT DOCUMENTS

| CN | 101867882 A | 10/2010 |
|---|---|---|
| CN | 102480468 A | 5/2012 |
| CN | 103581033 A | 2/2014 |

OTHER PUBLICATIONS

R2-1704473 LG Electronics Inc: "TP on SDAP PDU Format", 3GPP DRAFT, May 4, 2017 (May 4, 2017), XP051263586, total 4 pages.
(Continued)

*Primary Examiner* — Ajay Cattungal
(74) *Attorney, Agent, or Firm* — Stein IP, LLC

(57) ABSTRACT

A data transmission method and a communications device, wherein the method includes: processing, by a transmit end device, a data flow, where the processing includes: adding a flow identifier indication to the data flow, where the flow identifier indication is used to indicate whether a flow identifier is included; and sending, by the transmit end device, the processed data flow. A flow identifier indication is added to a data flow, where the flow identifier indication is used to indicate whether a flow identifier is included; and the data flow is transmitted according to the flow identifier indication, so that processing on the data flow is completed.

20 Claims, 12 Drawing Sheets

(51) Int. Cl.
  *H04W 28/02* (2009.01)
  *H04W 40/02* (2009.01)
  *H04W 80/02* (2009.01)
  *H04W 88/08* (2009.01)

(52) U.S. Cl.
  CPC ....... *H04W 28/0268* (2013.01); *H04W 40/02* (2013.01); *H04W 80/02* (2013.01); *H04W 88/08* (2013.01)

(56) References Cited

U.S. PATENT DOCUMENTS

| | | | | |
|---|---|---|---|---|
| 2018/0146398 A1* | 5/2018 | Kim | .................. | H04W 72/0406 |
| 2018/0279160 A1* | 9/2018 | Sayenko | ........... | H04W 72/0406 |
| 2019/0150023 A1* | 5/2019 | Cho | .................. | H04W 28/0263 |
| | | | | 370/235 |
| 2020/0021530 A1* | 1/2020 | Jiang | .................. | H04L 47/2441 |
| 2020/0022018 A1* | 1/2020 | Cho | ...................... | H04W 80/02 |

OTHER PUBLICATIONS

R2-1702829 Zte et al: "Discussion on the supporting of reflective QoS",3GPP Draft,Apr. 3, 2017 (Apr. 3, 2017), XP051244814,total 6 pages.

R2-1700029 Samsung: "NR QOS—Impact to RAN User Plane Protocol architecture",3GPP Draft; Jan. 17, 2017 (Jan. 17, 2017), XP051210617,total 4 pages.

3GPP TR 23.799 V14.0.0 (Dec. 2016),3rd Generation Partnership Project;Technical Specification Group Services and System Aspects;Study on Architecture for Next Generation System(Release 14),total 29 pages.

3GPP TS 23.501 V0.4.0 (Apr. 2017),3rd Generation Partnership Project;Technical Specification Group Services and System Aspects;System Architecture for the 5G System;Stage 2(Release 15),total 123 pages.

* cited by examiner

DATA TRANSMISSION METHOD AND COMMUNICATIONS DEVICE

CROSS-REFERENCE TO RELATED APPLICATIONS

This application is a continuation of International Application No. PCT/CN2018/085514, filed on May 3, 2018, which claims priority to Chinese Patent Application No. 201710313752.7, filed on May 5, 2017, the disclosures of the aforementioned applications are hereby incorporated by reference in their entireties.

TECHNICAL FIELD

Aspects of the present invention relate to the field of communications technologies, and in particular, to a data transmission method and a communications device.

BACKGROUND

In an existing long term evolution (Long Term Evolution, LTE) communications system, an end-to-end quality of service (Quality of Service, QoS) mechanism is implemented based on a bearer. A concept of QoS flow is introduced to a next-generation mobile communications system (for example, 5th generation mobile communications (5th-Generation, 5G)), and data may be transferred on a core network (Core Network, CN) and an interface between the CN and an access network (Access Network, A/V) in a QoS flow-based manner. However, a concept of a bearer is retained in the A/V, including an air interface, and one or more QoS flows may be mapped to a same bearer.

Different from a concept of bearer in an end-to-end evolved packet system (Evolved Packet System, EPS) in LTE, there are two layers of mapping in a QoS architecture of a 5G network. Downlink is used as an example. When a downlink Internet protocol (Internet Protocol, IP) data flow arrives at a user plane function network element (User Plane Function, UPF) of a core network, the UPF first maps the IP data flow to a QoS flow, then sends the QoS flow data to a next-generation access network NodeB (NG-RAN NodeB, gNB) by using an interface between an access network and the core network, and then the gNB maps the QoS flow to a bearer. In a current LTE user plane protocol stack architecture, data flow processing cannot be completed.

SUMMARY

Aspects of this application provide a data transmission method and a communications device, to complete processing on a data flow.

According to an aspect of this application, a data transmission method is provided. The method includes: processing, by a transmit end device, a data flow, where the processing includes: adding a service data adaptation protocol layer SDAP header to the data flow, where the SDAP header includes a flow identifier indication, and the flow identifier indication is used to indicate whether a flow identifier is included; and sending, by the transmit end device, the processed data flow. In this implementation, the service data adaptation protocol layer header is defined. The service data adaptation protocol layer header is added to the data flow, the data flow is processed, and the processed data is sent; and after the data flow is received, the service data adaptation protocol layer header in the data flow is removed. In this way, processing on the data flow is completed. In addition, the flow identifier indication is used to indicate whether the flow identifier is included. If the flow identifier indication indicates that the flow identifier is not included, no byte needs to be configured for the flow identifier in the SDAP header. Therefore, air interface overheads can be reduced. In an implementation, the transmit end device includes a base station; the flow identifier indication is further used to indicate whether the SDAP header includes an access stratum data flow reflective indication; and the method further includes: sending, by the base station, first signaling, where the first signaling includes a non-access stratum data flow reflective indication. Alternatively, in an implementation, the transmit end device includes a base station; the flow identifier indication is further used to indicate whether the SDAP header includes a non-access stratum data flow reflective indication; and the method further includes: sending, by the base station, second signaling, where the second signaling includes an access stratum data flow reflective indication. In this implementation, the flow identifier indication may be further used to implicitly indicate whether the SDAP header includes the access stratum data flow reflective indication or the non-access stratum data flow reflective indication. In this way, overheads of the SDAP header can be reduced. Another indication is transmitted by using signaling.

In another implementation, the transmit end device includes a base station; and the method further includes: sending, by the base station, an access stratum data flow reflective indication by using radio resource control signaling; and forwarding, by the base station, a non-access stratum data flow reflective indication from a core network. In this implementation, the access stratum data flow reflective indication and the non-access stratum data flow reflective indication may be transmitted by using signaling. In this way, overheads of the SDAP header can be reduced.

In still another implementation, the method further includes: receiving, by the transmit end device, the data flow; and removing, by the transmit end device, the SDAP header in the data flow. In this implementation, when receiving the data flow, the transmit end device removes the service data adaptation protocol layer header in the data flow, so that processing on the data flow is completed.

According to another aspect of this application, a data transmission method is provided. The method includes: receiving, by a receive end device, a data flow, where the data flow includes a service data adaptation protocol layer SDAP header, the SDAP header includes a flow identifier indication, and the flow identifier indication is used to indicate whether a flow identifier is included; and removing, by the receive end device, the SDAP header in the data flow. In this implementation, the service data adaptation protocol layer header is defined. After the data flow is received, the service data adaptation protocol layer header in the data flow is removed, so that processing on the data flow is completed.

With reference to the aspect and another aspect of this application, in an implementation, the SDAP header further includes the flow identifier, and the flow identifier is in a first byte and/or a second byte of the SDAP header. In this implementation, if a plurality of data flows are mapped to a bearer through flow transmission, the SDAP header needs to include the flow identifier. Some content of the flow identifier may be in the first byte of the SDAP header, to reduce the overheads of the SDAP header. If the flow identifier has a relatively large length, the flow identifier may be in the first byte and the second byte, or even more bytes.

With reference to the aspect and the another aspect of this application, in another implementation, the flow identifier indication is further used to indicate whether the SDAP header includes the access stratum data flow reflective indication ARI and the non-access stratum data flow reflective indication NRI. In this implementation, the flow identifier indication may be further used to implicitly indicate whether the SDAP header includes the access stratum data flow reflective indication and the non-access stratum data flow reflective indication. In this way, the overheads of the SDAP header can be reduced.

With reference to the aspect and the another aspect of this application, in still another implementation, the SDAP header further includes an indication of data information/control information. In this implementation, the indication of the data information/control information is added to the SDAP header, and the control information may be, for example, the access stratum data flow reflective indication or the non-access stratum data flow reflective indication. If the indication of the data information/control information indicates that the SDAP header includes the data information, the SDAP header does not need to include the access stratum data flow reflective indication and the non-access stratum data flow reflective indication. If the indication of the data information/control information indicates that the SDAP header includes the control information, the SDAP header needs to include the access stratum data flow reflective indication and the non-access stratum data flow reflective indication. In this way, the overheads of the SDAP header can be reduced to some extent.

With reference to the aspect and the another aspect of this application, in still another implementation, the SDAP header further includes an uplink/downlink indication. In this implementation, the uplink/downlink indication is added to the SDAP header. The access stratum data flow reflective indication and the non-access stratum data flow reflective indication may not be carried in uplink transmission. Therefore, if the uplink/downlink indication indicates that current transmission is uplink transmission, the SDAP header does not need to include the access stratum data flow reflective indication and the non-access stratum data flow reflective indication; or if the uplink/downlink indication indicates that current transmission is downlink transmission, the SDAP header may include the access stratum data flow reflective indication and the non-access stratum data flow reflective indication. In this way, the overheads of the SDAP header can be reduced to some extent.

According to still another aspect of this application, a communications device is provided. The communications device has functions of implementing behavior of the communications device in the foregoing method. The functions may be implemented by hardware, or may be implemented by hardware executing corresponding software. The hardware or the software includes one or more modules corresponding to the foregoing functions.

The communications device includes: a processor, configured to process a data flow, where the processing includes: adding a service data adaptation protocol layer SDAP header to the data flow, where the SDAP header includes a flow identifier indication, and the flow identifier indication is used to indicate whether a flow identifier is included; and a transmitter, configured to send the processed data flow.

Based on a same inventive concept, for a problem resolving principle and a beneficial effect of the apparatus, refer to the implementations of the method according to the aspect of this application and the brought beneficial effect. Therefore, for implementation of the apparatus, refer to the implementation of the method. Details are not described herein again.

According to still another aspect of this application, a communications device is provided. The communications device has functions of implementing behavior of the communications device in the foregoing method. The functions may be implemented by hardware, or may be implemented by hardware executing corresponding software. The hardware or the software includes one or more modules corresponding to the foregoing functions.

The communications device includes: a receiver, configured to receive a data flow, where the data flow includes a service data adaptation protocol layer SDAP header, the SDAP header includes a flow identifier indication, and the flow identifier indication is used to indicate whether a flow identifier is included; and a processor, configured to remove the SDAP header in the data flow.

Based on a same inventive concept, for a problem resolving principle and a beneficial effect of the apparatus, refer to the implementations of the method according to the another aspect of this application and the brought beneficial effect. Therefore, for implementation of the apparatus, refer to the implementation of the method. Details are not described herein again.

According to still another aspect of this application, a data transmission method is provided. The method includes: processing, by a transmit end device, a data flow, where the processing includes: adding a flow identifier indication to the data flow, where the flow identifier indication is used to indicate whether a flow identifier is included; and sending, by the transmit end device, the processed data flow. In this implementation, the flow identifier indication is added to the data flow. The flow identifier indication is used to indicate whether the flow identifier is included. The data flow is transmitted according to the flow identifier indication, so that processing on the data flow is completed. In addition, the flow identifier indication is used to indicate whether the flow identifier is included. If the flow identifier indication indicates that the flow identifier is not included, no byte needs to be configured for the flow identifier in an SDAP header. Therefore, air interface overheads can be reduced. In an implementation, the processing specifically includes: adding the flow identifier indication to a header or a trailer of a service data adaptation protocol layer-protocol data unit SDAP PDU. In this implementation, the flow identifier indication may be added to a header or a trailer of a newly added SDAP PDU.

In another implementation, the processing specifically includes: adding the flow identifier indication to a packet data convergence protocol PDCP header. In this implementation, the flow identifier indication may be added to the PDCP header. If the flow identifier is not included, the SDAP header may not be required. Therefore, transmission overheads can be further reduced.

In still another implementation, the transmit end device includes a base station; the flow identifier indication is further used to indicate whether the data flow includes an access stratum data flow reflective indication; and the method further includes: sending, by the base station, first signaling, where the first signaling includes a non-access stratum data flow reflective indication. Alternatively, in an implementation, the transmit end device includes a base station; the flow identifier indication is further used to indicate whether the data flow includes a non-access stratum data flow reflective indication; and the method further includes: sending, by the base station, second signaling, where the second signaling includes an access stratum data flow reflective indication. In this implementation, the flow identifier indication may be further used to implicitly indicate whether the data flow includes the access stratum data flow reflective indication or the non-access stratum data flow reflective indication. In this way, overheads of the SDAP header or the PDCP header can be reduced. Another indication is transmitted by using signaling.

In still another implementation, the transmit end device includes a base station; and the method further includes: sending, by the base station, an access stratum data flow reflective indication by using radio resource control signaling; and forwarding, by the base station, a non-access stratum data flow reflective indication from a core network. In this implementation, the access stratum data flow reflective indication and the non-access stratum data flow reflective indication may be transmitted by using signaling. In this way, overheads of the SDAP header can be reduced.

In still another implementation, the method further includes: receiving, by the transmit end device, the data flow; and obtaining, by the transmit end device, the flow identifier indication. In this implementation, after receiving the data flow, the transmit end device obtains the flow identifier indication. In this way, the transmit end device can learn of a quantity of transmitted data flows, to perform subsequent processing on the data flow.

In still another implementation, after the receiving, by the transmit end device, the data flow, the method further includes: removing, by the transmit end device, the SDAP header of the SDAP PDU. In this implementation, when receiving the data flow, the transmit end device removes the service data adaptation protocol layer header in the data flow, so that processing on the data flow is completed.

According to still another aspect of this application, a data transmission method is provided. The method includes: receiving, by a receive end device, a data flow, where the data flow includes a flow identifier indication, and the flow identifier indication is used to indicate whether a flow identifier is included; and obtaining, by the receive end device, the flow identifier indication. In this implementation, after receiving the data flow, the receive end device obtains the flow identifier indication. In this way, the receive end device can learn of a quantity of transmitted data flows, to perform subsequent processing on the data flow.

In an implementation, the flow identifier indication is in a header or a trailer of a service data adaptation protocol layer-protocol data unit SDAP PDU, or the flow identifier indication is in a packet data convergence protocol PDCP header.

In another implementation, after the receiving, by a receive end device, a data flow, the method further includes: removing, by the receive end device, the SDAP header of the SDAP PDU. In this implementation, the service data adaptation protocol layer header is defined. After the data flow is received, the service data adaptation protocol layer header in the data flow is removed, so that processing on the data flow is completed.

With reference to the aspect and the another aspect of this application, in an implementation, the SDAP header further includes the flow identifier, and the flow identifier is in a first byte and/or a second byte of the SDAP header. In this implementation, if a plurality of data flows are mapped to a bearer through flow transmission, the SDAP header needs to include the flow identifier. Some content of the flow identifier may be in the first byte of the SDAP header, to reduce the overheads of the SDAP header. If the flow identifier has a relatively large length, the flow identifier may be in the first byte and the second byte, or even more bytes.

With reference to the aspect and the another aspect of this application, in another implementation, the flow identifier indication is further used to indicate whether the data flow includes the access stratum data flow reflective indication and the non-access stratum data flow reflective indication. In this implementation, the flow identifier indication may be further used to implicitly indicate whether the data flow includes the access stratum data flow reflective indication and the non-access stratum data flow reflective indication. In this way signaling overheads can be reduced.

With reference to the aspect and the another aspect of this application, in still another implementation, the data flow further includes an indication of data information/control information. In this implementation, the indication of the data information/control information is added to the data flow, and the control information may be, for example, the access stratum data flow reflective indication or the non-access stratum data flow reflective indication. If the indication of the data information/control information indicates that the data flow includes the data information, the data flow does not need to include the access stratum data flow reflective indication and the non-access stratum data flow reflective indication. If the indication of the data information/control information indicates that the data flow includes the control information, the data flow needs to include the access stratum data flow reflective indication and the non-access stratum data flow reflective indication. In this way, the signaling overheads can be reduced to some extent.

With reference to the aspect and the another aspect of this application, in still another implementation, the data flow further includes an uplink/downlink indication. In this implementation, the uplink/downlink indication is added to the data flow. The access stratum data flow reflective indication and the non-access stratum data flow reflective indication may not be carried in uplink transmission. Therefore, if the uplink/downlink indication indicates that current transmission is uplink transmission, the data flow does not need to include the access stratum data flow reflective indication and the non-access stratum data flow reflective indication; or if the uplink/downlink indication indicates that current transmission is downlink transmission, the data flow may include the access stratum data flow reflective indication and the non-access stratum data flow reflective indication. In this way, the signaling overheads can be reduced to some extent.

According to still another aspect of this application, a communications device is provided. The communications device has functions of implementing behavior of the communications device in the foregoing method. The functions may be implemented by hardware, or may be implemented by hardware executing corresponding software. The hardware or the software includes one or more modules corresponding to the foregoing functions.

The communications device includes: a processor, configured to process a data flow, where the processing includes: adding a flow identifier indication to the data flow, where the flow identifier indication is used to indicate whether a flow identifier is included; and a transmitter, configured to send the processed data flow.

Based on a same inventive concept, for a problem resolving principle and a beneficial effect of the apparatus, refer to the implementations of the method according to the aspect of this application and the brought beneficial effect. Therefore, for implementation of the apparatus, refer to the implementation of the method. Details are not described herein again.

According to still another aspect of this application, a communications device is provided. The communications device has functions of implementing behavior of the communications device in the foregoing method. The functions may be implemented by hardware, or may be implemented by hardware executing corresponding software. The hardware or the software includes one or more modules corresponding to the foregoing functions.

The communications device includes: a receiver, configured to receive a data flow, where the data flow includes a flow identifier indication, and the flow identifier indication is used to indicate whether a flow identifier is included; and a processor, configured to obtain the flow identifier.

Based on a same inventive concept, for a problem resolving principle and a beneficial effect of the apparatus, refer to the implementations of the method according to the another aspect of this application and the brought beneficial effect. Therefore, for implementation of the apparatus, refer to the implementation of the method. Details are not described herein again.

Still another aspect of this application provides a computer readable storage medium. The computer readable storage medium stores an instruction. When the instruction is run on a computer, the computer is enabled to perform the method according to the foregoing aspects.

Still another aspect of this application provides a communications chip. The chip stores an instruction. When the instruction is run on a communications device, a computer is enabled to perform the method according to the foregoing aspects.

Still another aspect of this application provides a computer program product including an instruction. When the computer program product is run on a computer, the computer is enabled to perform the method according to the foregoing aspects.

BRIEF DESCRIPTION OF DRAWINGS

To describe the technical solutions in embodiments or the background of the present invention more clearly, the following describes the accompanying drawings required for the embodiments or the background of the present invention.

DESCRIPTION OF EMBODIMENTS

The following describes embodiments of the present invention with reference to the accompanying drawings in the embodiments of the present invention.

Figure 2:
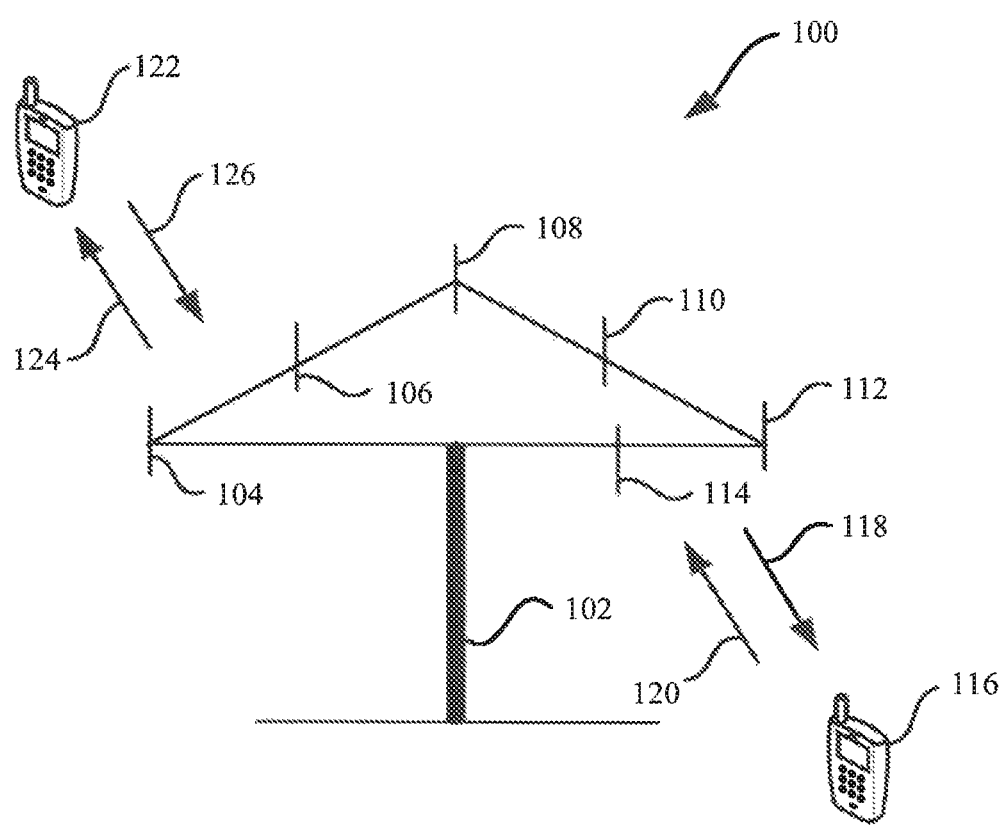
FIG. 2 is a schematic architectural diagram of a communications system according to an embodiment of the present invention.

FIG. 2 is a schematic architectural diagram of a communications system according to an embodiment of the present invention. The communications system includes a base station and a terminal device. The communications system may be a global system for mobile communications (Global System for Mobile Communication, GSM), a code division multiple access (Code Division Multiple Access, CDMA) system, a wideband code division multiple access (Wideband Code Division Multiple Access, WCDMA) system, a worldwide interoperability for microwave access (Worldwide Interoperability for Microwave Access, WiMAX) system, a long term evolution (Long Term Evolution, LTE) system, a 5G communications system (for example, a new radio (new radio, NR) system, or a communications system that integrates a plurality of communications technologies (for example, a communications system integrating an LTE technology and an NR technology)), or a subsequent evolved communications system.

The terminal device in aspects of this application is a device having a wireless communication function, and may be a hand-held device, a vehicle-mounted device, a wearable device, or a computing device that has a wireless communication function, or another processing device connected to a wireless modem. The terminal device may have different names in different networks, for example, user equipment (User Equipment, UE), an access terminal, a subscriber unit, a subscriber station, a mobile station, a mobile console, a remote station, a remote terminal, a mobile device, a user terminal, a terminal, a wireless communications device, a user agent or a user apparatus, a cellular phone, a cordless telephone set, a session initiation protocol (Session Initiation Protocol, SIP) phone, a wireless local loop (Wireless Local Loop, WLL) station, a personal digital assistant (Personal Digital Assistant, PDA), or a terminal device in a 5G network or a future evolved network.

A network device in this application is a device that is deployed in a radio access network and that is configured to provide a wireless communication function, and includes, but is not limited to, a base station (such as a BTS (Base Transceiver Station, BTS), a NodeB (NodeB, NB), an evolved NodeB (Evolutional Node B, eNB or eNodeB), a transmission node or a transmission reception point (transmission reception point TRP or TP) in an NR system, a next-generation NodeB (generation nodeB, gNB), or a base station or a network device in a future communications network), a relay station, an access point, a vehicle-mounted device, a wearable device, a wireless fidelity (Wireless-Fidelity, Wi-Fi) site, a wireless backhaul node, a small cell, a micro base station, or the like.

Specifically, in FIG. 2, a base station 102 may include a plurality of antenna groups. Each antenna group may include one or more antennas. For example, one antenna group may include antennas 104 and 106, and another antenna group may include antennas 108 and 110. In addition, an additional group may be included, and the additional group may include antennas 112 and 114. Different antenna groups in high-frequency communication may be combined into different antenna panels (panel). For example, an antenna group forms a beam that points to a direction, and another antenna group forms another beam that points to another direction. More antennas may be required to adapt to different device capabilities. Therefore, different quantities of antennas may be disposed for the additional group based on different device capabilities. For example, two antennas are shown for each antenna group in FIG. 2. However, each group may have more or fewer antennas. The base station 102 may additionally include a transmitter chain and a receiver chain. A person of ordinary skill in the art may understand that the transmitter chain and the receiver chain each may include a plurality of components related to signal sending and receiving, for example, a processor, a modulator, a multiplexer, a demodulator, a demultiplexer, or an antenna.

The base station 102 may communicate with one or more terminal devices, for example, a terminal device 116 and a terminal device 122. However, it may be understood that the base station 102 may communicate with any quantity of terminal devices that are similar to the terminal device 116 or 122. As shown in FIG. 2, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126. In a frequency division duplex (Frequency Division Duplex, FDD) system, the forward link 118 may use a frequency band different from that used by the reverse link 120, and the forward link 124 may use a frequency band different from that used by the reverse link 126. In addition, in a time division duplex (Time Division Duplex, TDD) system, the forward link 118 and the reverse link 120 may use a same frequency band, and the forward link 124 and the reverse link 126 may use a same frequency band.

An area covered by each group of antennas designed for communication and/or an area covered by transmission of each group of antennas are/is referred to as a sector of the base station 102. For example, an antenna group may be designed to communicate with a terminal device in a sector within coverage of the base station 102. In a process in which the base station 102 communicates with the terminal devices 116 and 122 by using respective forward links 118 and 124, a transmit antenna of the base station 102 may improve signal-to-noise ratios of the forward links 118 and 124 through beamforming. In addition, compared with a manner in which a base station uses a single antenna to send signals to all access terminal devices served by the base station, when the base station 102 sends, through beamforming, signals to the terminal devices 116 and 122 that are randomly scattered in the related coverage area, a mobile node in a neighboring cell is subject to less interference.

At a given time, the base station 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain, for example, generate, receive from another communications apparatus, or store in a memory, a particular quantity of data bits that need to be sent to the wireless communications receiving apparatus through a channel. The data bits may be included in one or more transport blocks of data, and the transport block may be segmented to generate a plurality of code blocks.

Figure 1:
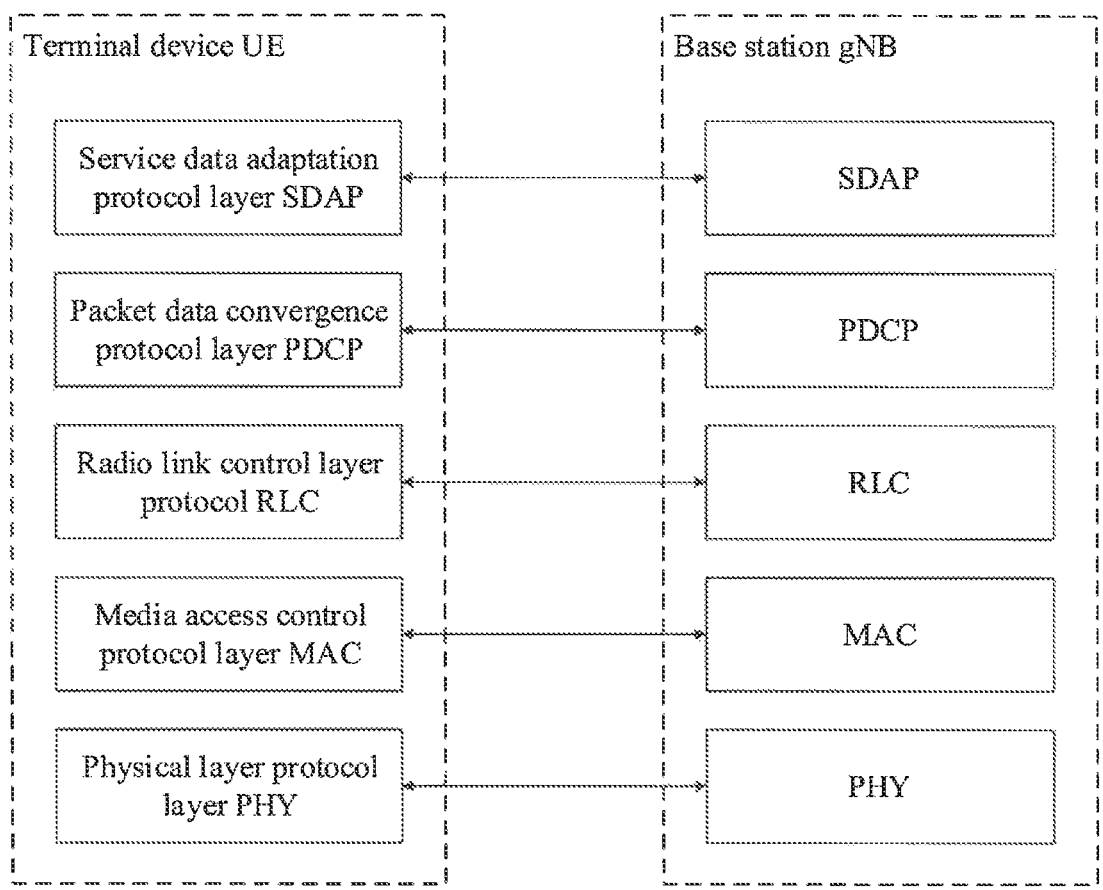
FIG. 1 is a schematic diagram of a user plane protocol stack architecture of a next-generation mobile communications network.

FIG. 1 is a schematic diagram of a user plane protocol stack architecture of a next-generation mobile communications network. In next-generation mobile communications, a service data adaptation protocol layer (Service Data Adaptation Protocol, SDAP) is newly added based on an LTE user plane protocol stack architecture (the LTE user plane protocol stack architecture includes a packet data convergence protocol (Packet Data Convergence Protocol, PDCP) layer, a radio link control protocol (Radio Link Control Protocol, RLC) layer, a media access control protocol (Media Access Control Protocol, MAC) layer, and a physical layer protocol (Physical Layer Protocol, PHY) layer). However, at present, a packet header of the SDAP layer is not defined. Consequently, processing on a data flow cannot be completed, and the data flow cannot be transmitted.

The embodiments of the present invention provide a data transmission method and a communications device. A flow identifier indication is added to a data flow, where the flow identifier indication is used to indicate whether a flow identifier is included; and the data flow is transmitted according to the flow identifier indication, so that processing on the data flow is completed.

Figure 3:
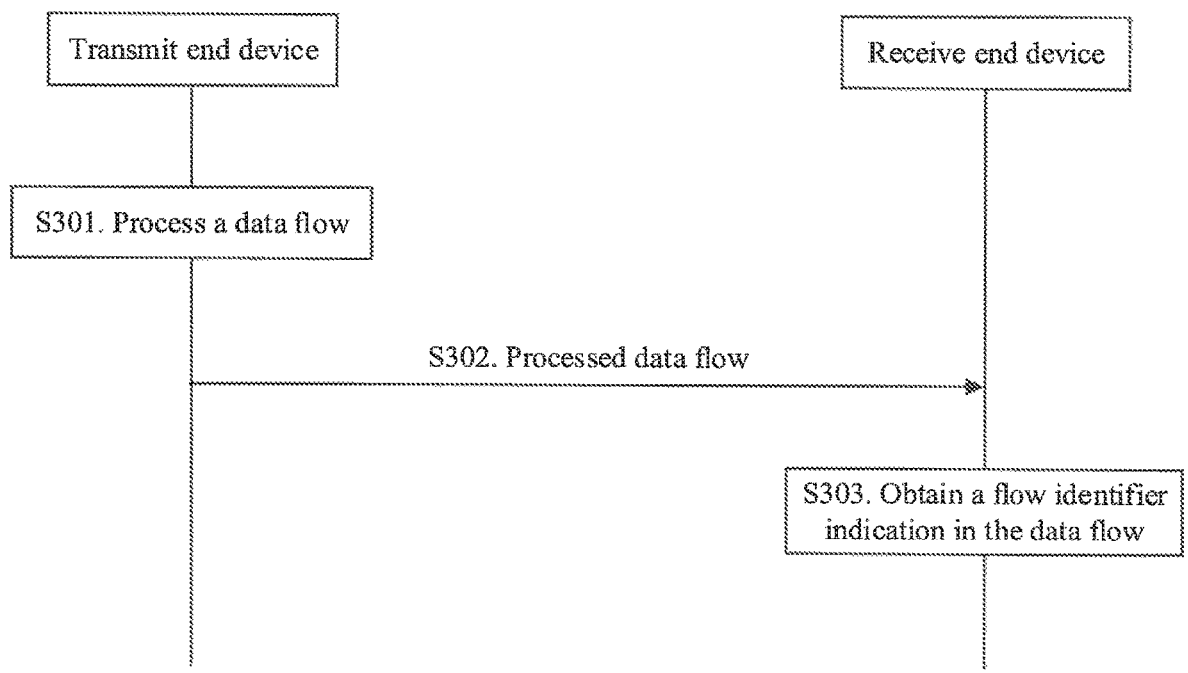
FIG. 3 is a schematic interaction diagram of a data transmission method according to an embodiment of the present invention.

FIG. 3 is a schematic interaction diagram of a data transmission method according to an embodiment of the present invention. The method may include the following steps.

S301. A transmit end device processes a data flow.

In this embodiment, the data flow may be transmitted in uplink, or may be transmitted in downlink. The transmit end device may be a base station or a terminal device, and a receive end device may also be a terminal device or a base station. The transmit end device and the receive end device may transmit data by using an air interface bearer. The transmit end device receives a data flow on which flow transmission is performed, and then transmits the data flow by using a bearer; or flow transmission needs to be performed on a data flow that is transmitted by the transmit end device by using a bearer. Therefore, flow-to-bearer mapping needs to be performed. Therefore, in this embodiment of the present invention, an SDAP layer is added between a transmission control protocol/internet protocol (Transmission Control Protocol/Internet Protocol, TCP/IP) layer and a PDCP layer, to facilitate data transmission. It should be noted that the SDAP layer is a protocol layer between the TCP/IP layer and the PDCP layer, and the SDAP layer may alternatively have another name. Any protocol layer between the TCP/IP layer and the PDCP layer may be understood as the SDAP layer in this application. This is not limited herein.

Figure 4:
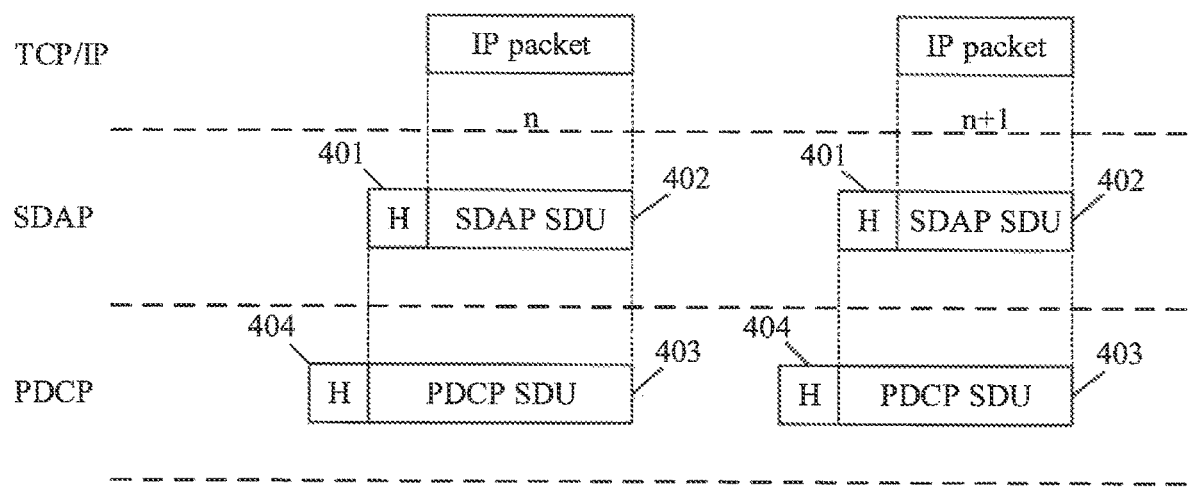
FIG. 4 is a schematic structural diagram of an SDAP layer.

FIG. 4 is a schematic structural diagram of the SDAP layer. The SDAP layer includes an SDAP header (SDAP Header) 401 and an SDAP service data unit (Service Data Unit, SDU) 402. In FIG. 4, the TCP/IP layer transmits an IP data packet, or referred to as a data flow (IP Packet), to the SDAP layer, and the SDAP layer adds the SDAP header 401 to the data flow. The foregoing data flow may be considered as an SDAP SDU. Then, the SDAP layer transmits, to the PDCP layer, the data flow to which the SDAP header is added. The PDCP layer performs similar processing, that is, adds a PDCP header 404. The data flow to which the SDAP header is added may be considered as a PDCP SDU. The data flow to which the PDCP header is added may be transmitted to a next layer. For subsequent processing, refer to the prior art. Details are not described herein. FIG. 4 shows an example of processing on an $n^{th}$ IP packet and an $(n+1)^{th}$ IP packet.

In NR, when receiving a data flow, a receive end device cannot learn of a size of an SDAP header before processing the data flow, and the size of the SDAP header mainly depends on a flow identifier (Flow ID, FID). Therefore, a flow identifier of each data flow needs to be indicated to the receive end device.

In an implementation, the SDAP header includes a flow identifier indication (Flow ID Indication, FII), and the flow identifier indication is used to indicate whether a flow identifier is included. One flow identifier corresponds to one data flow. One or more data flows may be mapped to one bearer. If a core network transmits one data flow to a transmit end device or the transmit end device sends one data flow to a core network, the flow identifier may not be included. If the core network transmits a plurality of data flows to the transmit end device or the transmit end device sends a plurality of data flows to the core network, the flow identifier needs to be included. The flow identifier indication may be one bit. A value of the flow identifier indication may be "1" or "0". For example, "1" is used to indicate that the SDAP header includes the flow identifier, and "0" is used to indicate that the SDAP header does not include the flow identifier; or on the contrary, "1" is used to indicate that the SDAP header does not include the flow identifier, and "0" is used to indicate that the SDAP header includes the flow identifier. The SDAP header may be located at the front of the SDAP SDU, or may be located at the end of the SDAP SDU. If the SDAP header is located at the end of the SDAP SDU, a robust header compression protocol (RoHC) function can be conveniently used.

In another implementation, the PDCP header may include the flow identifier indication.

If the PDCP header includes the flow identifier indication, the following technical effects may be achieved:

(1) Transmission overheads are reduced.

The transmission overheads can be reduced when the flow identifier is not included. For a manner in which the PDCP header does not include the flow identifier indication, if the flow identifier is not included, the SDAP header may not be required. Therefore, the transmission overheads can be further reduced.

(2) The robust header compression protocol (RoHC) function is conveniently used.

RoHC supports header compression of limited upper layer protocols, for example, the TCP/IP and the user datagram protocol (User Datagram Protocol, UDP)/IP. Therefore, the newly introduced SDAP protocol header cannot be identified by the RoHC protocol. For a manner in which the PDCP header includes the flow identifier indication, the flow identifier indication is in the PDCP, and the PDCP may learn of an exact length of an SDAP header of each data flow. Therefore, the PDCP may extract the SDAP header before the RoHC compression, and add the SDAP header to the PDCP header after the RoHC compression. In this application, the transmit end only needs to add the flow identifier indication to the data flow, where the flow identifier indication may be added to the SDAP header or the SDAP trailer.

S302. The transmit end device sends the processed data flow.

After processing in a protocol stack, the transmit end device sends the processed data flow to the receive end device. The receive end device receives the data flow.

S303. The receive end device obtains the flow identifier indication in the data flow.

After receiving the data flow, the receive end device obtains the flow identifier indication. In this way, the receive end device can learn of a quantity of transmitted data flows, perform subsequent processing on the data flow.

Further, the receive end device removes an SDAP header of the SDAP PDU. After receiving the processed data flow, that is, the data flow to which the SDAP header is added, the receive end device needs to remove the SDAP header, to obtain net data in the SDAP SDU. Alternatively, the data flow needs to be transmitted through flow transmission. The SDAP header also needs to be removed in the flow transmission, and data transmission is directly performed, According to the data transmission method provided in this embodiment of the present invention, the flow identifier indication is added to the data flow, where the flow identifier indication is used to indicate whether the flow identifier is included; and the data flow is transmitted according to the flow identifier indication, so that processing on the data flow is completed.

Figure 5:
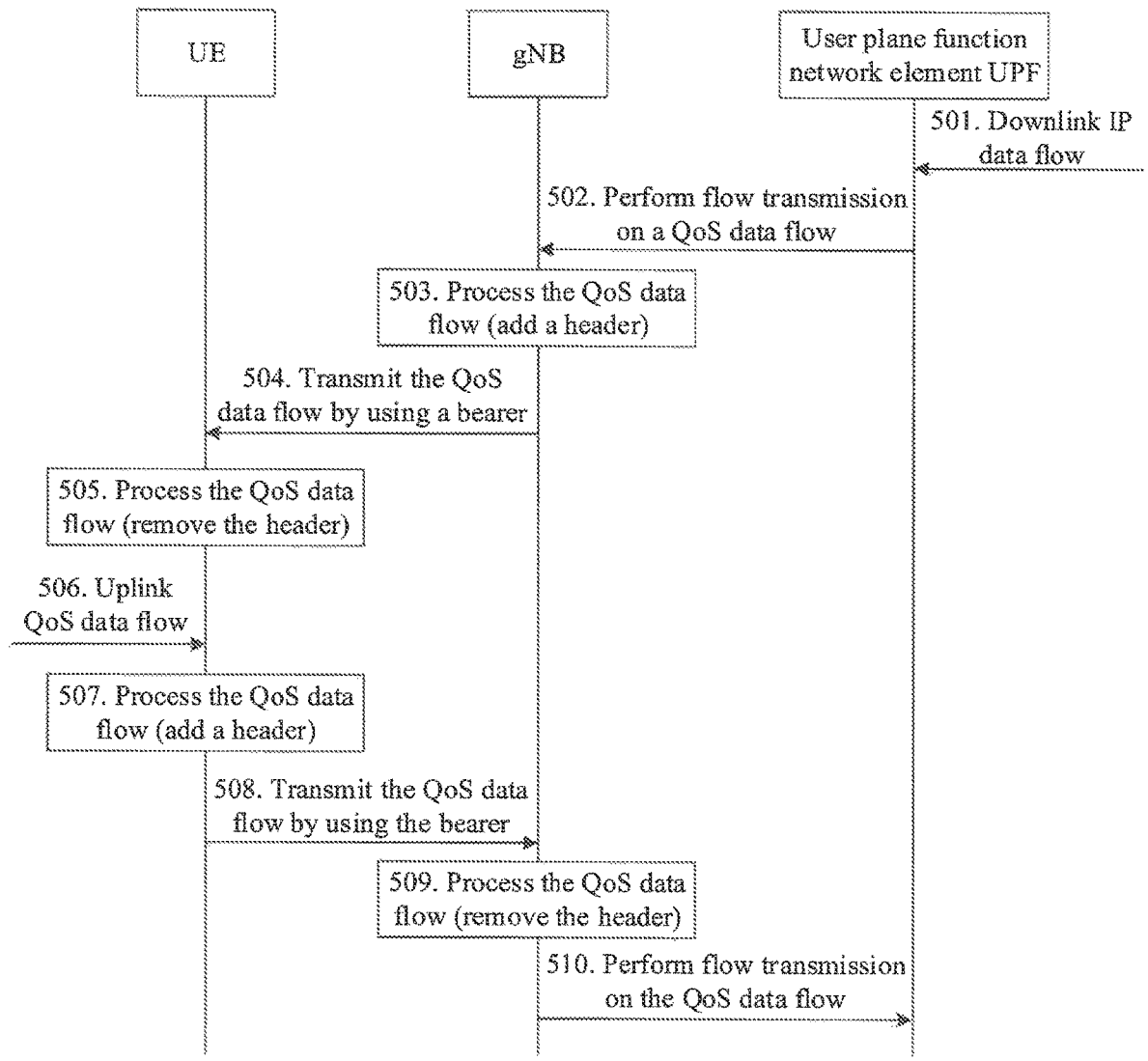
FIG. 5 is a schematic interaction diagram of an example of a data transmission method.

The foregoing data transmission procedure is described below by using downlink transmission and uplink transmission. In downlink transmission, the transmit end device is a base station, and the receive end device is a terminal device. In uplink transmission, the transmit end device is a terminal device, and the receive end device is a base station. Therefore, when the transmit end device receives the data flow, the method may further include: receiving the data flow; and removing the SDAP header in the data flow. FIG. 5 is a schematic interaction diagram of an example of a data transmission method. FIG. 5 shows signaling and data exchange between UE, a base station, and a UPF. As shown in FIG. 5, the data transmission method includes the following steps: 501. A downlink IP data flow (briefly referred to as an "IP flow" below) arrives at the UPF of a core network, and the UPF maps the IP data flow into a QoS data flow (briefly referred to as a "QoS flow" below). 502. The UPF sends (through flow transmission) the QoS flow to a gNB through an interface between an access network and the core network, and the base station receives the QoS flow. 503. The gNB processes the QoS flow, that is, adds an SDAP header (certainly, the processing further includes processing of another protocol layer, refer to the prior art, and details are not described herein), and maps, to a bearer, the QoS flow on which flow transmission is performed. 504. The gNB transmits the QoS flow to the UE by using the bearer, and the UE receives the QoS flow. 505. The UE removes a header in the received QoS data flow. In this case, downlink transmission is completed. 506. The UE may perform uplink QoS data flow transmission. 507. The UE processes the QoS data flow, that is, adds the SDAP header, and maps the QoS flow to the bearer. 508. The UE transmits the QoS flow to the gNB by using the bearer, and the gNB receives the QoS flow. 509. After receiving the processed QoS flow, the gNB needs to transmit the processed QoS flow to the core network through flow transmission, and needs to remove the header in the QoS flow. 510. The gNB sends the QoS flow without the header to the UPF through flow transmission, and the UPF receives the QoS flow. The base station in FIG. 5 may be the gNB.

The following describes definition of the SDAP header by using some specific implementations.

Figure 6A:
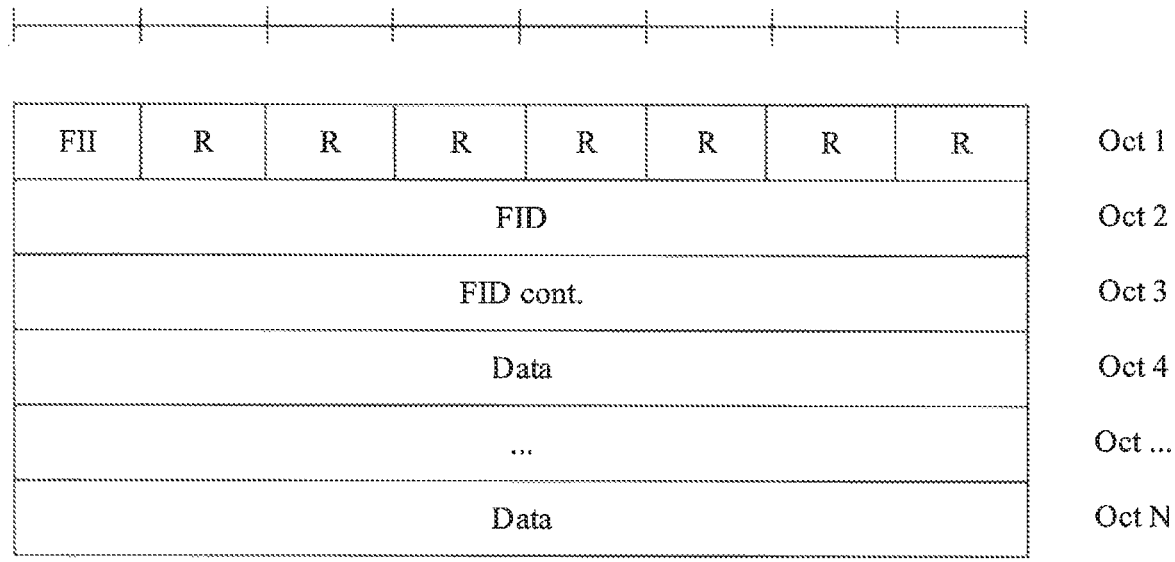
FIG. 6a to FIG. 6k are schematic structural diagrams of examples of an SDAP header.

In an implementation, an FII indication bit is in a first byte. FIG. 6a is a schematic structural diagram of an example of an SDAP header. Bytes (Octal, Oct) occupied by the SDAP header are aligned with bytes in an SDAP SDU. The FII indication bit is in Oct1, and occupies one bit. Another bit of this byte is used as a reserved bit (Reserved, R), to facilitate forward compatibility. If an FII indicates that the SDAP header includes a flow identifier, a second byte may include the flow identifier. It should be noted that if a length of the flow identifier is relatively large, the flow identifier may still continue to occupy a third byte and a next byte of the SDAP header as required. In the example in FIG. 6a, the flow identifier is in the second byte Oct2 and the third byte Oct3.

In another implementation, the flow identifier may alternatively be in the first byte occupied by the FII indication bit.

Figure 6B:
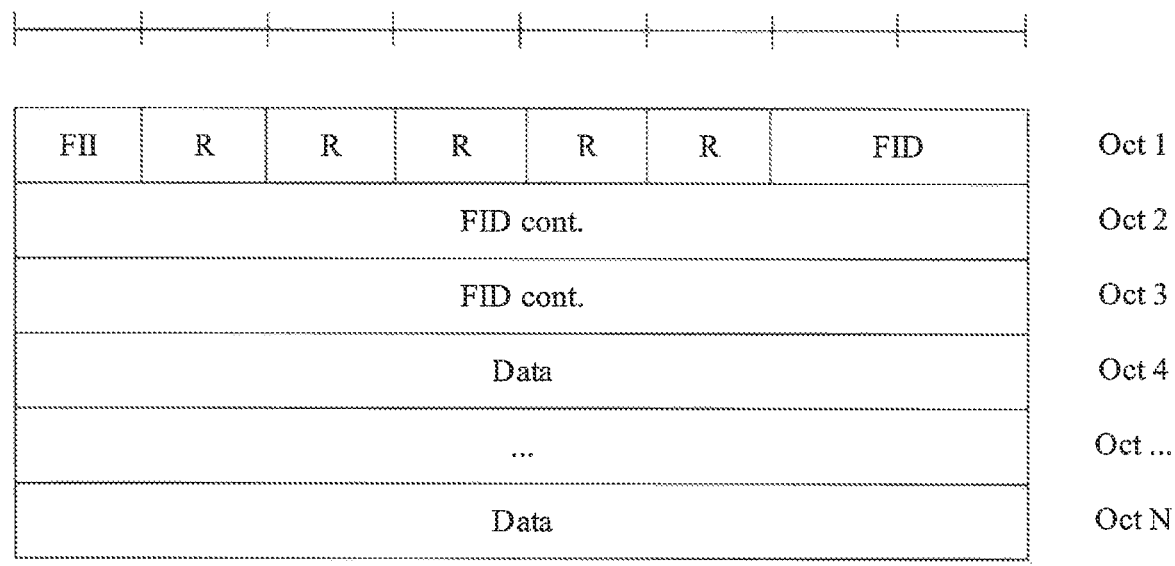

FIG. 6b is a schematic structural diagram of an example of another SDAP header, some FID content is in Oct1, and the remaining FID content is in Oct2 and Oct3. In this way, overheads of the SDAP header can be reduced. If a length of the flow identifier is relatively large, the flow identifier may continue to occupy a third byte and a next byte of the SDAP header as required. In the example in FIG. 6b, the flow identifier is in the first byte to the third byte of the SDAP header.

In an uplink transmission process of the UE and the gNB, the UE may perform transmission in a reflective QoS (Reflective QoS) manner. Reflective QoS is a method in which UE obtains a manner of mapping an uplink data transmission IP flow to a QoS flow and mapping a QoS flow to a bearer. A basic idea is that the UE derives a manner of mapping an uplink data transmission QoS flow to the bearer based on information about mapping a downlink data transmission IP flow to the QoS flow and mapping the QoS flow to the bearer.

If a network determines to use the reflective QoS manner in uplink, the UPF may add a reflective QoS indication (Reflective QoS Indication, RQI) to a packet header of a data flow. After the data flow arrives at the UE, if a packet header of a data packet includes the RQI, when transmitting an uplink data flow, the UE performs data transmission based on the same QoS indication as that of a downlink data flow that is recently received.

Specifically, in this embodiment, the RQI further includes an access stratum data flow reflective indication (Access Stratum Reflective QoS Indication, ARI) and a non-access stratum data flow reflective indication (Non-Access Stratum Reflective QoS Indication, NRI). The ARI is used to indicate whether to use the reflective QoS manner in transmission of a data flow on an access stratum. The NRI is used to indicate whether to use the reflective QoS manner in transmission of a data flow on a non-access stratum.

Figure 6C:
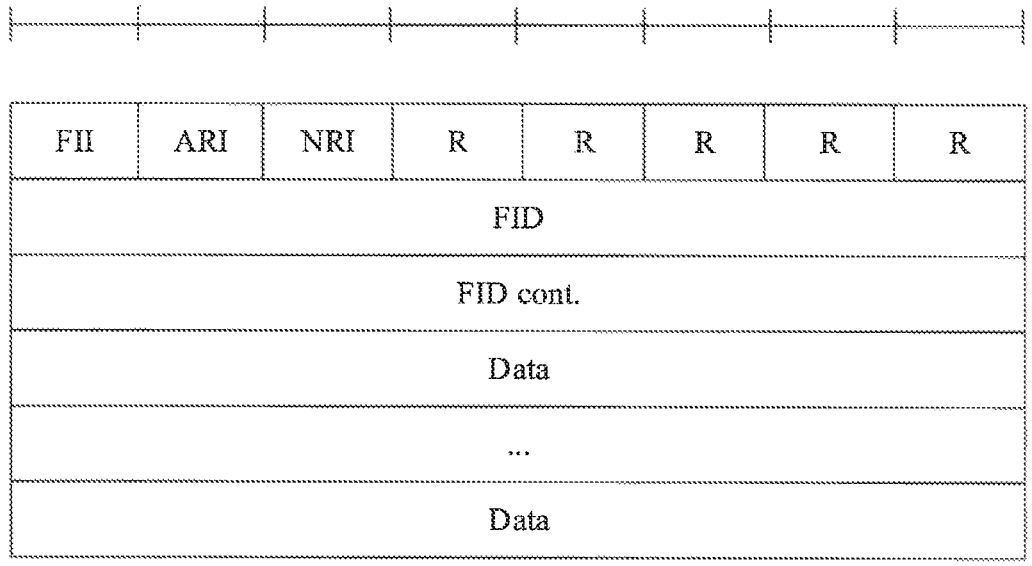
Figure 6D:
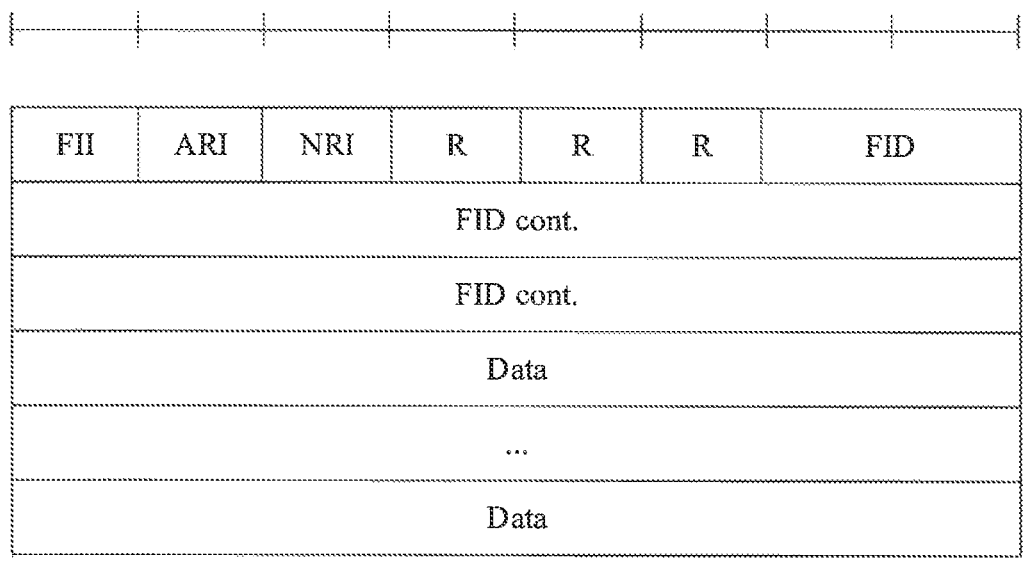

In still another implementation, FIG. 6c is a schematic structural diagram of an example of still another SDAP header. The SDAP header includes an FII, an ARI, and an NRI. If the FII indicates that a flow identifier is included, the SDAP header further includes the flow identifier. An arrangement sequence of the FII, the ARI, and the NRI is not limited. The ARI and the NRI each occupy one bit. For example, when a value of the ARI is "1", it indicates that the reflective QoS manner is used in transmission of the data flow on the access stratum; when the value of the ARI is "0", it indicates that the reflective QoS manner is not used in transmission of the data flow on the access stratum; and vice versa. For another example, when a value of the NRI is "1", it indicates that the reflective QoS manner is used in transmission of the data flow on the non-access stratum; when the value of the NRI is "0", it indicates that the reflective QoS manner is not used in transmission of the data flow on the non-access stratum; and vice versa. FIG. 6d is a schematic structural diagram of an example of still another SDAP header. A difference between FIG. 6d and FIG. 6c is that Oct1 further includes some RD content. In the foregoing described case, a same SDAP header is used in uplink and downlink. However, different SDAP headers may be used in the uplink and the downlink. In other words, only the FII needs to be included in the uplink, and the ARI and the NRI do not need to be included. A structure of an uplink SDAP header is shown in FIG. 6a and FIG. 6b.

In still another implementation, the SDAP header includes the FII, and the FII is further used to indicate whether the SDAP header includes the ARI and the NRI. If the FII indicates that the flow identifier is included, the SDAP header further includes the flow identifier. As shown in FIG. 6a and FIG. 6b, the FII implicitly indicates whether the SDAP header includes the ARI and the NRI. To be specific, for example, if a value of the FII is "1", it implicitly indicates that the SDAP header includes the ARI and the NRI; if a value of the FII is "0", it implicitly indicates that the SDAP header does not include the ARI and the NRI. Alternatively, if a value of the FII is "1", it implicitly indicates that the SDAP header does not include the ARI and the NRI; if a value of the FII is "0", it implicitly indicates that the SDAP header includes the ARI and the NRI. In this way, overheads of the SDAP header can be reduced, and forward compatibility is facilitated.

Figure 6E:
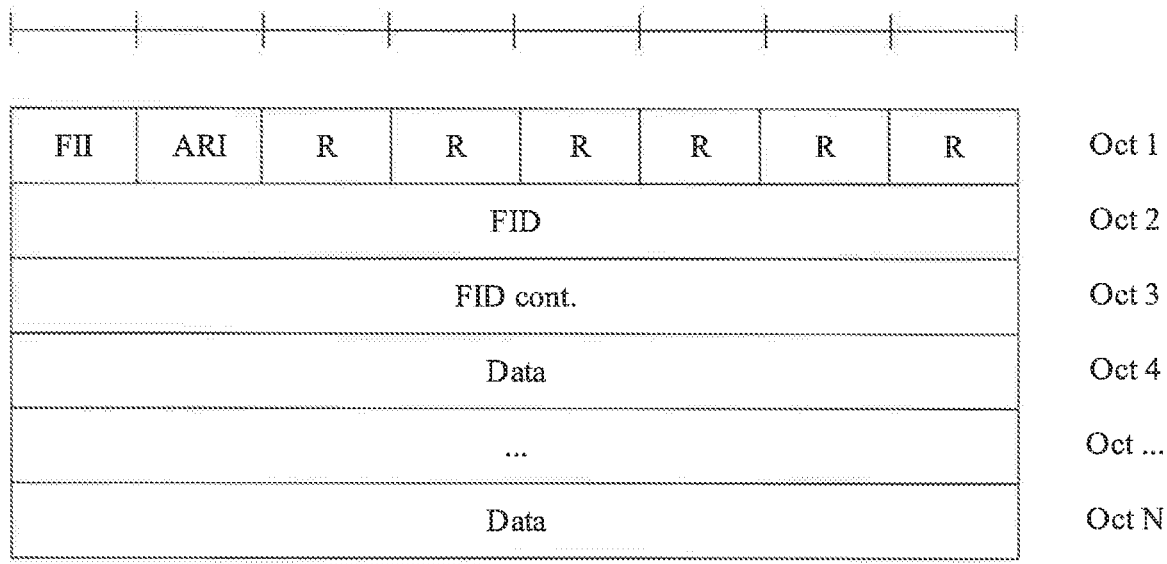
Figure 6F:
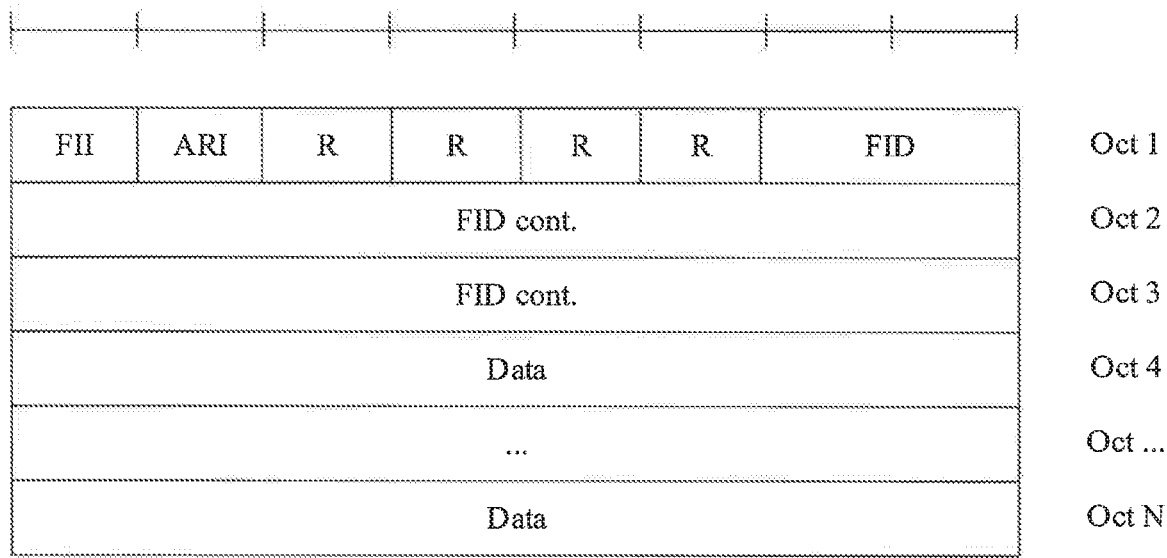

In still another implementation, the SDAP header includes the FII, and the FII is further used to indicate whether the SDAP header includes the ARI. If the RI indicates that the flow identifier is included, the SDAP header further includes the flow identifier. FIG. 6e is a schematic structural diagram of an example of still another SDAP header. The FII is further used to indicate whether the SDAP header includes the ARI. When the transmit end device is a base station, the base station sends first signaling, where the first signaling includes the NRI. A difference between FIG. 6f and FIG. 6e is that Oct1 further includes FID content. In this way, overheads of the SDAP header can be reduced, and forward compatibility is facilitated.

Figure 6G:
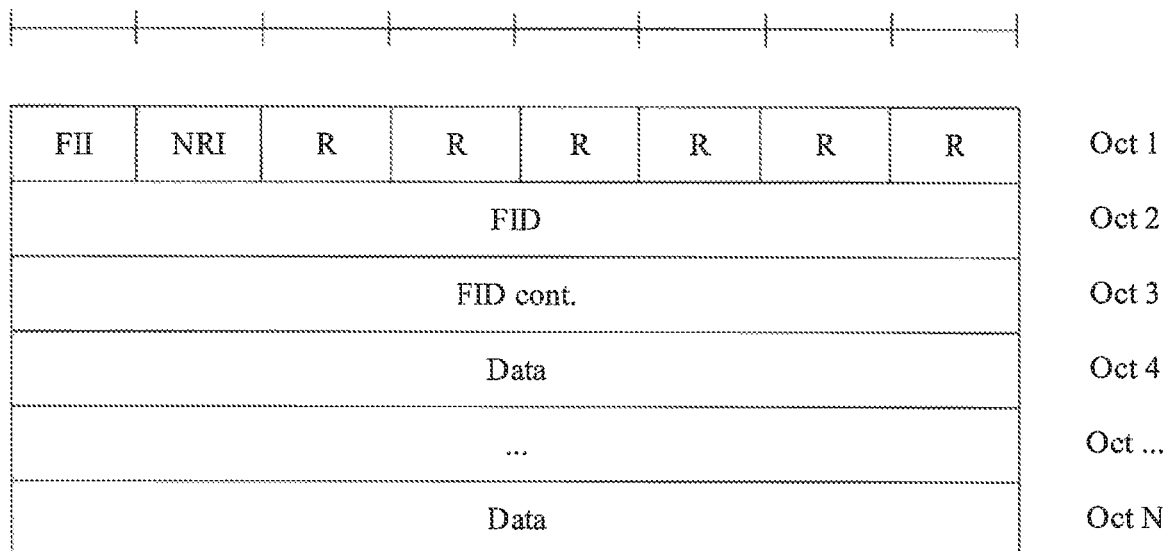
Figure 6H:
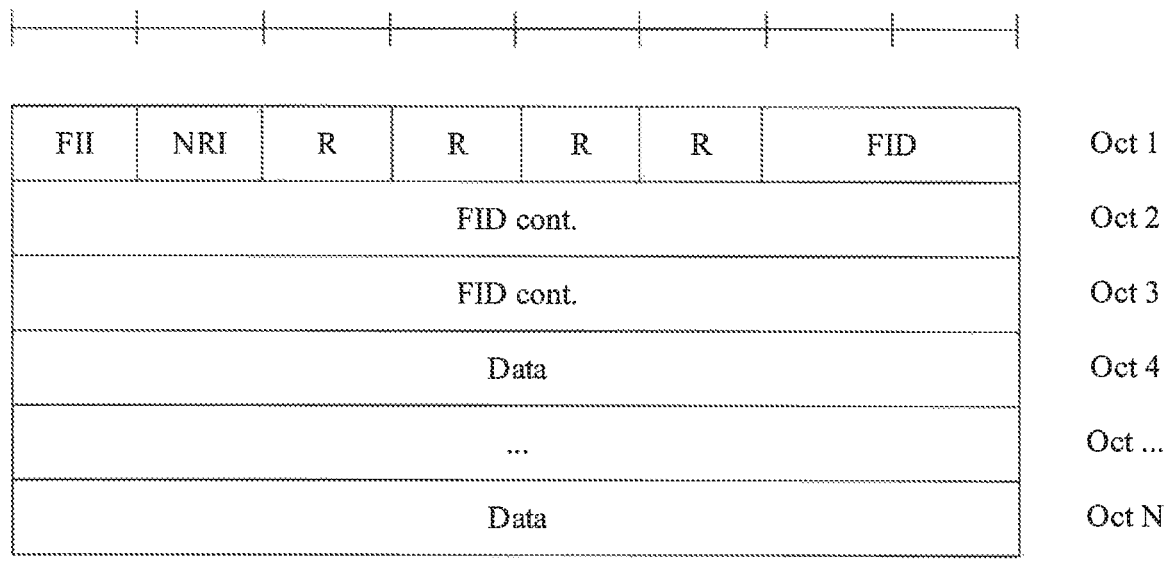

In still another implementation, the SDAP header includes the FII, and the FII is further used to indicate whether the SDAP header includes the NRI. If the FII indicates that the flow identifier is included, the SDAP header further includes the flow identifier, FIG. 6g is a schematic structural diagram of an example of still another SDAP header. The FII is further used to indicate whether the SDAP header includes the NRI. When the transmit end device is a base station, the base station sends second signaling, where the second signaling includes the ARI. A difference between FIG. 6h and FIG. 6g is that Oct1 further includes FID content.

In still another implementation, the SDAP header includes the FII. If the FII indicates that the flow identifier is included, the SDAP header further includes the flow identifier. If the transmit end device is a base station, and the receive end device is UE, the base station may send radio resource control (Radio Resource Control, RRC) signaling to the UE, where the RRC signaling includes the ARI; and the base station forwards an NRI from the core network to the UE. In other words, the base station is used for only transparent transmission between the core network element and the UE.

Figure 6I:
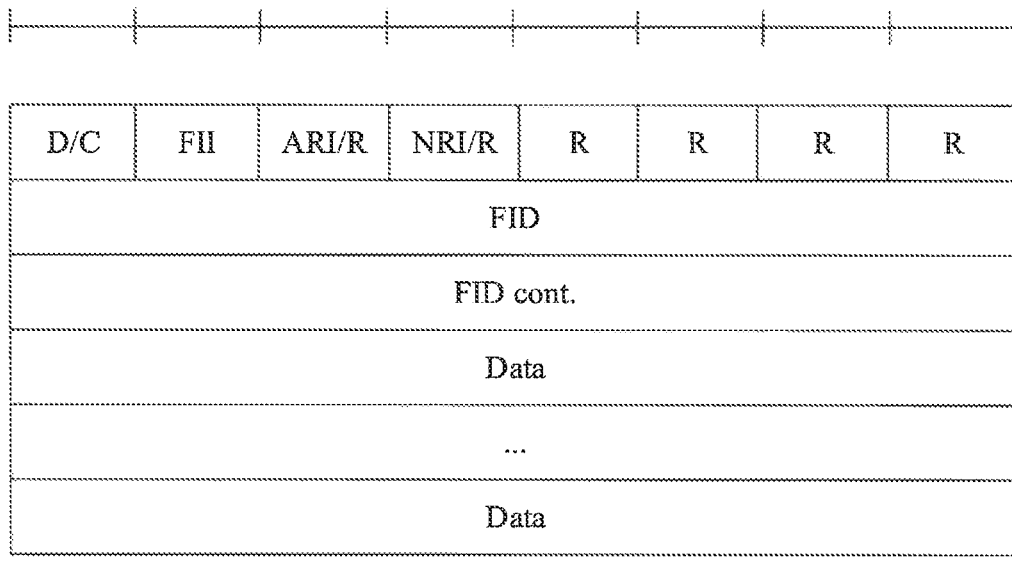
Figure 6J:
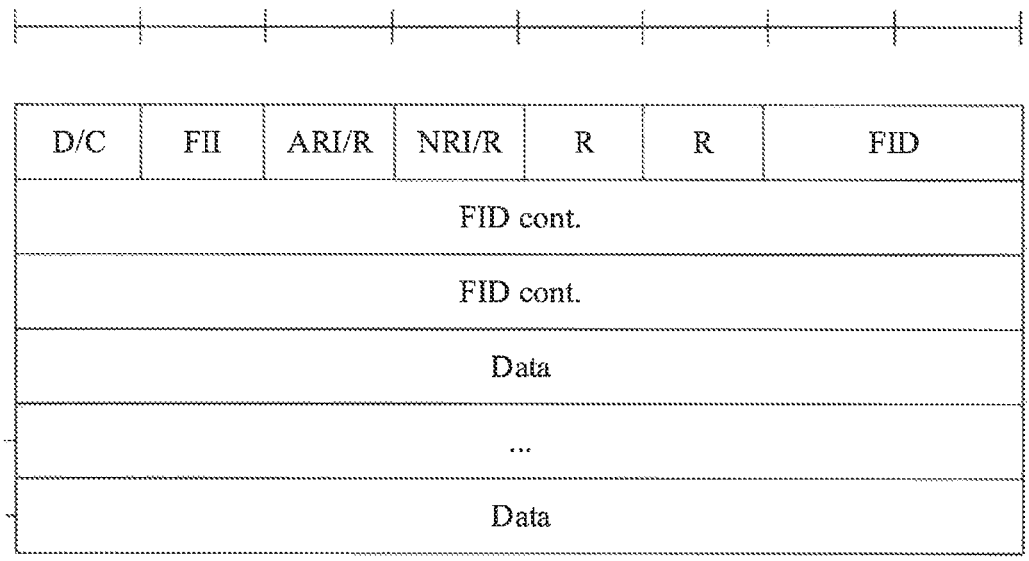

In still another implementation, the SDAP header includes the FII and an indication bit (O/C) of data information/control information. If the FII indicates that the flow identifier is included, the SDAP header further includes the flow identifier. The ARI and the NRI may be considered as control information. In this way, an SDAP header that carries indication information of the ARI/NRI may be expressed as [C, FII, ARI, NRI, R, R, R, R]; and an SDAP header that does not carry the indication information of the ARI/NRI may be expressed as [D, FII, R, R, R, R, R, R]. FIG. 6i is a schematic structural diagram of still another SDAP header. Indication bits of both the ARI and the NRI may be reused. The control information may alternatively be other control information than the ARI and the NRI. A difference between FIG. 6j and FIG. 6i is that Oct1 may further include content of the flow identifier.

In still another implementation, the SDAP header includes the FII and a downlink/uplink indication bit (D/U). If the FII indicates that the flow identifier is included, the SDAP header further includes the flow identifier. In this way, in downlink transmission, the SDAP header may be expressed as [D, FII, ARI, NRI, R, R, R]; and in uplink transmission, the SDAP header may be expressed as [U, FII, R, R, R, R, R, R]. The indication bits of both the ARI and the NRI may be reused. In this way, overheads of the SDAP header can be reduced, and forward compatibility is facilitated.

Figure 6K:
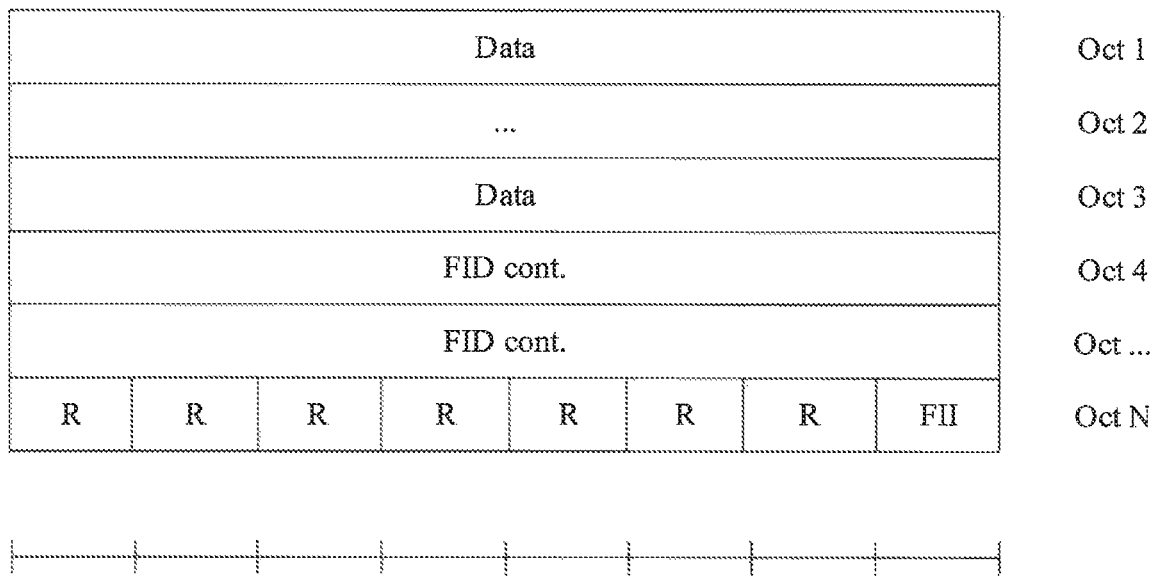

In still another implementation, in the embodiments described above, the SDAP header may be located at the front of the SDAP SDU. To reduce influence on robust header compression (Robust Header Compression, RoHC) of the PDCP layer, the SDAP header may alternatively be added to the end of the SDAP SDU. FIG. 6k is a schematic structural diagram of an example of still another SDAP header. The SDAP header is disposed at the end of an SDAP SDU. FI indication bits are aligned from a rear end.

The method in the embodiments of the present invention is described above in detail, and an apparatus in an embodiment of the present invention is provided below.

Figure 7:
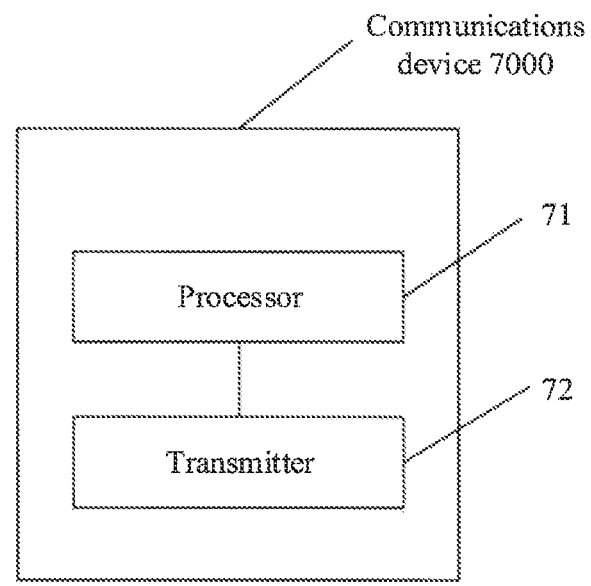
FIG. 7 is a schematic diagram of a communications device according to an embodiment of the present invention.

FIG. 7 is a schematic diagram of modules of a communications device according to an embodiment of the present invention. The communications device 7000 may include a processor 71 and a transmitter 72.

The processor 71 is configured to process a data flow, where the processing includes: adding a flow identifier indication to the data flow, where the flow identifier indication is used to indicate whether a flow identifier is included.

The transmitter 72 is configured to send the processed data flow.

In an implementation, the processing specifically includes: adding the flow identifier indication to a header or a trailer of a service data adaptation protocol layer-protocol data unit SDAP PDU.

In another implementation, the processing specifically includes: adding the flow identifier indication to a packet data convergence protocol PDCP header.

In still another implementation, the communications device includes a base station;
the flow identifier indication is further used to indicate whether the data flow includes an access stratum data flow reflective indication; and
the transmitter 72 is further configured to send first signaling, where the first signaling includes a non-access stratum data flow reflective indication NRI; or
the flow identifier indication is further used to indicate whether the data flow includes a non-access stratum data flow reflective indication; and
the transmitter 72 is further configured to send second signaling, where the second signaling includes an access stratum data flow reflective indication.

In another implementation, the communications device includes a base station;
the transmitter 72 is further configured to send an access stratum data flow reflective indication by using radio resource control signaling; and
the transmitter 72 is further configured to forward a non-access stratum data flow reflective indication from a core network.

In still another implementation, the communications device 7000 further includes a receiver (not shown).
The receiver is configured to receive the data flow.
The processor 71 is further configured to obtain the flow identifier indication.

In still another implementation, the processor 71 is further configured to remove the SDAP header of the SDAP PDU in the data flow.

In still another implementation, the SDAP header further includes the flow identifier, and the flow identifier is in a first byte and/or a second byte of the SDAP header.

In still another implementation, the flow identifier indication is further used to indicate whether the data flow includes the access stratum data flow reflective indication and the non-access stratum data flow reflective indication.

In still another implementation, the data flow further includes an indication of data information/control information.

For details, refer to the descriptions in the foregoing method embodiments. Details are not described herein again.

According to the communications device provided in this embodiment of the present invention, the flow identifier indication is added to the data flow, where the flow identifier indication is used to indicate whether the flow identifier is included; and the data flow is transmitted according to the flow identifier indication, so that processing on the data flow is completed.

Figure 8:
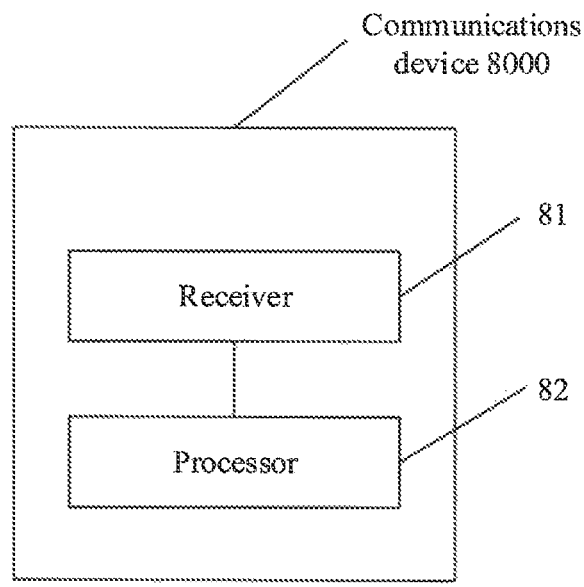
FIG. 8 is a schematic diagram of another communications device according to an embodiment of the present invention.

FIG. 8 is a schematic diagram of modules of another communications device according to an embodiment of the present invention. The communications device 8000 includes a receiver 81 and a processor 82.

The receiver 81 is configured to receive a data flow, where the data flow includes a flow identifier indication, and the flow identifier indication is used to indicate whether a flow identifier is included.

The processor 82 is configured to obtain the flow identifier indication.

In an implementation, the flow identifier indication is in a header or a trailer of a service data adaptation protocol layer-protocol data unit SDAP PDU, or the flow identifier indication is in a packet data convergence protocol PDCP header.

In another implementation, the processor 82 is further configured to remove the SDAP header of the SDAP PDU.

In still another implementation, the SDAP header further includes the flow identifier, and the flow identifier is in a first byte and/or a second byte of the SDAP header.

In another implementation, the flow identifier indication is further used to indicate whether the data flow includes an access stratum data flow reflective indication and a non-access stratum data flow reflective indication.

In still another implementation, the data flow further includes an indication of data information/control information.

For details, refer to the descriptions in the foregoing method embodiments. Details are not described herein again.

According to the communications device provided in this embodiment of the present invention, the flow identifier indication is added to the data flow, where the flow identifier indication is used to indicate whether the flow identifier is included; and the data flow is transmitted according to the flow identifier indication, so that processing on the data flow is completed.

An embodiment of the present invention further provides a communications device 9000. The hardware architecture shown in FIG. 9 may be used for the communications device 9000. For example, the communications device 9000 may be a base station, or may be a terminal device. The communications device 9000 may include a receiver 91, a transmitter 92, a memory 93, and a processor 94. The receiver, the transmitter, the memory, and the processor are connected to each other by using a bus.

The memory 93 includes, but is not limited to, a random access memory (Random Access Memory, RAM), a read-only memory (Read-Only Memory, ROM), an erasable programmable read only memory (Erasable Programmable Read Only Memory, EPROM), or a compact disc read-only memory (Compact Disc Read-Only Memory, CD-ROM). The memory 93 is configured to store a related instruction and related data.

The receiver 91 is configured to receive data and/or a signal, and the transmitter 92 is configured to send data and/or a signal. The transmitter 92 and the receiver 91 may be independent components or an integral component such as a transceiver.

The processor 94 may include one or more processors, for example, include one or more central processing units (Central Processing Unit, CPU). When the processor is one CPU, the CPU may be a single-core CPU or a multi-core CPU.

The memory 93 is configured to store program code and data of the communications device, and may be a separate component or may be integrated into the processor.

The foregoing components may be integrated into a chip for implementation, for example, integrated into a baseband chip for implementation.

Specifically, the processor 94 performs the following operations:

processing a data flow, where the processing includes: adding a flow identifier indication to the data flow, where the flow identifier indication is used to indicate whether a flow identifier is included; and sending the processed data flow by using the transmitter 92.

In an implementation, the processing specifically includes: adding the flow identifier indication to a header or a trailer of a service data adaptation protocol layer-protocol data unit SDAP PDU.

In another implementation, the processing specifically includes: adding the flow identifier indication to a packet data convergence protocol PDCP header.

In still another implementation, the communications device 9000 includes a base station;

the flow identifier indication is further used to indicate whether the data flow includes an access stratum data flow reflective indication; and the transmitter 92 sends first signaling, where the first signaling includes a non-access stratum data flow reflective indication; or the flow identifier indication is further used to indicate whether the data flow includes a non-access stratum data flow reflective indication; and the transmitter 92 sends second signaling, where the second signaling includes an access stratum data flow reflective indication.

In another implementation, the communications device 9000 includes a base station;

the transmitter 92 sends an access stratum data flow reflective indication in radio resource control signaling; and the transmitter 92 forwards a non-access stratum data flow reflective indication from a core network.

In still another implementation, the processor 94 is further configured to perform the following operations:

receiving the data flow by using the receiver 91; and obtaining the flow identifier indication.

In still another implementation, after performing the operation of receiving the data flow by using the receiver 91, the processor 94 further performs the following operation:

removing the SDAP header in the data flow.

In still another implementation, the SDAP header further includes the flow identifier, and the flow identifier is in a first byte and/or a second byte of the SDAP header.

In still another implementation, the flow identifier indication is further used to indicate whether the data flow includes the access stratum data flow reflective indication and the non-access stratum data flow reflective indication.

In still another implementation the data flow further includes an indication of data information/control information.

For details, refer to the descriptions in the foregoing method embodiments. Details are not described herein again.

Figure 9:
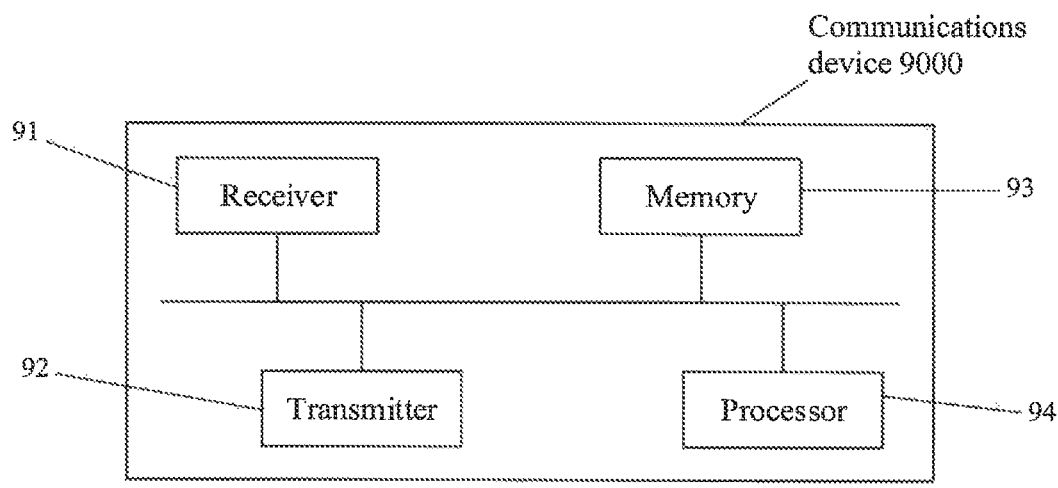
FIG. 9 is a schematic diagram of a communications device according to an embodiment of the present invention.

It may be understood that FIG. 9 shows merely a simplified design of the communications device. During actual application, the communications device may also include other necessary components, including but not limited to any quantity of transceivers, processors, controllers, memories, and the like, and all communications devices that can implement this embodiment of the present invention shall fall within the protection scope of the present invention.

According to the communications device provided in this embodiment of the present invention, the flow identifier indication is added to the data flow, where the flow identifier indication is used to indicate whether the flow identifier is included; and the data flow is transmitted according to the flow identifier indication, so that processing on the data flow is completed.

An embodiment of the present invention further provides a communications device. The communications device may be the communications device in the foregoing communications system, for example, may be the base station, or may be the terminal device. The hardware architecture shown in FIG. 9 may be used for the communications device. The communications device may include a receiver, a transmitter, a memory, and a processor. The receiver, the transmitter, the memory, and the processor are connected to each other by using a bus.

The memory includes, but is not limited to, a RAM, a ROM, an EPROM, or a CD-ROM. The memory is configured to store a related instruction and related data.

The receiver is configured to receive data and/or a signal, and the transmitter is configured to send data and/or a signal. The transmitter and the receiver may be independent components or an integral component such as a transceiver.

The processor may include one or more processors, for example, include one or more CPUs. When the processor is one CPU, the CPU may be a single-core CPU or a multi-core CPU.

The memory is configured to store program code and data of the communications device, and may be a separate component or may be integrated into the processor.

The foregoing components may be integrated into a chip for implementation, for example, integrated into a baseband chip for implementation.

Specifically, the processor performs the following operations:

receiving a data flow by using the receiver, where the data flow includes a flow identifier indication, and the flow identifier indication is used to indicate whether a flow identifier is included; and obtaining the flow identifier indication.

In an implementation, the flow identifier indication is in a header or a trailer of a service data adaptation protocol layer-protocol data unit SDAP PDU, or the flow identifier indication is in a packet data convergence protocol PDCP header.

In another implementation, the processor is further configured to perform the following operation: removing the SDAP header of the SDAP PDU.

In still another implementation, the SDAP header further includes the flow identifier, and the flow identifier is in a first byte and/or a second byte of the SDAP header.

In still another implementation, the flow identifier indication is further used to indicate whether the data flow includes the access stratum data flow reflective indication and the non-access stratum data flow reflective indication.

In still another implementation, the data flow further includes an indication of data information/control information.

For details, refer to the descriptions in the foregoing method embodiments. Details are not described herein again.

It may be understood that FIG. 9 shows merely a simplified design of the communications device. During actual application, the communications device may also include other necessary components, including but not limited to any quantity of transceivers, processors, controllers, memories, and the like, and all communications devices that can implement the present invention shall fall within the protection scope of the present invention.

According to the communications device provided in this embodiment of the present invention, the flow identifier indication is added to the data flow, where the flow identifier indication is used to indicate whether the flow identifier is included; and the data flow is transmitted according to the flow identifier indication, so that processing on the data flow is completed.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that such implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instruction may be stored in a computer readable storage medium, or may be transmitted by using the computer readable storage medium. The computer instruction may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any available medium accessible by a computer, or a data storage device, such as a server or a data center, integrating one or more available media. The available medium may be a magnetic medium (for example, a floppy disk, a hard disk, or a magnetic tape), an optical medium (for example, a DVD), a semiconductor medium (for example, a solid-state disk (Solid State Disk, SSD)), or the like.

A person of ordinary skill in the art may understand that all or some of the processes of the methods in the embodiments may be implemented by a computer program instructing related hardware. The program may be stored in a computer readable storage medium. When the program is being executed, the procedures in the foregoing method embodiments may be included. The foregoing storage medium includes any medium that can store program code, such as a ROM, a random access memory RAM, a magnetic disk, or an optical disc.

What is claimed is:

1. A data transmission method, comprising:
processing, by a transmit end device, a data flow, wherein the processing comprises:
adding a flow identifier indication to the data flow, wherein the flow identifier indication is used to indicate whether a flow identifier is comprised; and
sending, by the transmit end device, the processed data flow.

2. The method according to claim 1, wherein the processing comprises:
adding the flow identifier indication to a header or a trailer of a service data adaptation protocol layer-protocol data unit SDAP PDU.

3. The method according to claim 2, further comprising:
receiving, by the transmit end device, the data flow; and
obtaining, by the transmit end device, the flow identifier indication.

4. The method according to claim 3, wherein after h receiving, by the transmit end device, the data flow, the method further comprises:

removing, by the transmit end device, the SDAP header of the SDAP PDU.

5. The method according to claim 2, wherein the SDAP header comprises the flow identifier, and the flow identifier is in a first byte and/or a second byte of the SDAP header.

6. The method according to claim 1, wherein the processing further comprises: adding the flow identifier indication to a packet data convergence protocol PDCP header.

7. The method according to claim 1, wherein:
the transmit end device comprises a base station;
the flow identifier indication is further used to indicate whether the data flow comprises an access stratum data flow reflective indication; and
the method further comprises: sending, by the base station, first signaling, wherein the first signaling comprises a non-access stratum data flow reflective indication;
or the flow identifier indication is further used to indicate whether the data flow comprises the non-access stratum data flow reflective indication; and
the method further comprises: sending, by the base station, second signaling, wherein the second signaling comprises the access stratum data flow reflective indication.

8. The method according to claim 1, wherein the transmit end device comprises a base station; and
the method further comprises:
sending, by the base station, an access stratum data flow reflective indication by using radio resource control signaling; and
forwarding, by the base station, a non-access stratum data flow reflective indication from a core network.

9. The method according to claim 1, wherein the flow identifier indication is further used to indicate whether the data flow comprises an access stratum data flow reflective indication and a non-access stratum data flow reflective indication.

10. The method according to claim 1, wherein the data flow further comprises an indication of data information/control information.

11. A data transmission method, comprising:
receiving, by a receive end device, a data flow, wherein the data flow comprises a flow identifier indication, and the flow identifier indication is used to indicate whether a flow identifier is comprised; and
obtaining, by the receive end device, the flow identifier indication.

12. The method according to claim 11, wherein the flow identifier indication is in a header or a trader of a service data adaptation protocol layer-protocol data unit SDAP PDU, or the flow identifier indication is in a packet data convergence protocol PDCP header.

13. The method according to claim 12, wherein after the receiving, by the receive end device, the data flow, the method further comprises:
removing, by the receive end device, the SDAP header of the SDAP PDU.

14. A communications device, comprising:
a processor, configured to process a data flow, wherein the processing comprises:
adding a flow identifier indication to the data flow, wherein the flow identifier indication is used to indicate whether a flow identifier is comprised; and
a transmitter, configured to send the processed data flow.

15. The communications device according to claim 14, wherein the processing comprises: adding the flow identifier indication to a header or a trailer of a service data adaptation protocol layer-protocol data unit SDAP PDU.

16. The communications device according to claim 14, wherein the processing comprises: adding the flow identifier indication to a packet data convergence protocol PDCP header.

17. The communications device according to claim 14, wherein the communications device comprises a base station;
the flow identifier indication is further used to indicate whether the data flow comprises an access stratum data flow reflective indication; and
the transmitter is further configured to send first signaling, wherein the first signaling comprises a non-access stratum data flow reflective indication;
or
the flow identifier indication is further used to indicate whether the data flow comprises the non-access stratum data flow reflective indication; and
the transmitter is further configured to send second signaling, wherein the second signaling comprises the access stratum data flow reflective indication.

18. A communications device, comprising:
a receiver, configured to receive a data flow, wherein the data flow comprises a flow identifier indication, and the flow identifier indication is used to indicate whether a flow identifier is comprised; and
a processor, configured to obtain the flow identifier indication.

19. The communications device according to claim 18, wherein the flow identifier indication is in a header or a trailer of a service data adaptation protocol layer-protocol data unit SDAP PDU, or the flow identifier indication is in a packet data convergence protocol PDCP header.

20. The method according to claim 19, wherein the processor is further configured to remove the SDAP header of the SDAP PDU.

* * * * *